(12) United States Patent
Kim et al.

(10) Patent No.: US 11,505,203 B2
(45) Date of Patent: Nov. 22, 2022

(54) APPARATUS AND METHOD OF CONTROLLING FUEL GAUGE IN CIRCUIT MODE OF VEHICLE

(71) Applicants: HYUNDAI MOTOR COMPANY, Seoul (KR); KIA MOTORS CORPORATION, Seoul (KR)

(72) Inventors: Keun Soo Kim, Yongin-si (KR); Dong Hyun Kim, Hwaseong-si (KR); Jung Hoon Park, Suwon-si (KR); Ji Soo Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 44 days.

(21) Appl. No.: 17/219,027

(22) Filed: Mar. 31, 2021

(65) Prior Publication Data
US 2022/0089175 A1    Mar. 24, 2022

(30) Foreign Application Priority Data
Sep. 23, 2020 (KR) .......................... 10-2020-0122813

(51) Int. Cl.
*G06F 1/00* (2006.01)
*B60W 50/14* (2020.01)
*B60K 15/03* (2006.01)

(52) U.S. Cl.
CPC .............. *B60W 50/14* (2013.01); *B60K 15/03* (2013.01); *B60K 2015/03217* (2013.01)

(58) Field of Classification Search
CPC .............. F02D 19/025; F02D 19/0623; F02D 2041/2086; F02D 2041/1418; F02D 41/1404; F02D 41/1405
See application file for complete search history.

(56) References Cited

U.S. PATENT DOCUMENTS

| 11,215,150 B1 * | 1/2022 | Kim .................... F02D 41/3082 |
| 2018/0182241 A1 * | 6/2018 | Ahn ...................... B60K 35/00 |
| 2022/0089020 A1 * | 3/2022 | Kim ........................ G01F 23/80 |

FOREIGN PATENT DOCUMENTS

| KR | 10-2006-0027611 A | 3/2006 |
| KR | 10-2008-0037787 A | 5/2008 |
| KR | 10-1786655 B | 11/2017 |
| KR | 10-2018-0124601 A | 11/2018 |

* cited by examiner

*Primary Examiner* — John Kwon
(74) *Attorney, Agent, or Firm* — Lempia Summerfield Katz LLC

(57) ABSTRACT

One form of an apparatus for controlling a fuel gauge in a circuit mode of a vehicle includes: a vehicle mode determiner configured to compare a damping time with a response time, and to determine whether a driving mode of the vehicle is a general mode or a circuit mode; a fuel amount calculator configured to calculate a current fuel amount of the vehicle based on fuel consumption (FCO) by the engine or a change in the resistance of a fuel sender based on the driving mode of the vehicle; and a fuel gauge controller configured to control the fuel gauge based on the calculated current fuel amount, wherein the response time is a time taken for the fuel gauge to actually descend to a state 'empty' from a state 'full' due to fuel consumption by an engine.

18 Claims, 4 Drawing Sheets

APPARATUS AND METHOD OF CONTROLLING FUEL GAUGE IN CIRCUIT MODE OF VEHICLE

CROSS-REFERENCE TO RELATED APPLICATION

This application claims priority to and the benefit of Korean Patent Application No. 10-2020-0122813, filed on Sep. 23, 2020, the entire contents of which are incorporated herein by reference.

FIELD

The present disclosure relates to an apparatus and method of controlling a fuel gauge in a circuit mode of a vehicle.

BACKGROUND

The statements in this section merely provide background information related to the present disclosure and may not constitute prior art.

In general, in order to detect the current amount of fuel stored in a fuel tank of a vehicle, a fuel gauge is operated using a thermostat bimetal via ascent and descent of a float installed in a fuel tank. Generally, when the current fuel amount is lowered to 10% or less, a fuel shortage warning light installed in a cluster within the vehicle is turned on. In response thereto, with reference to the fuel shortage warning light, a driver goes to a nearby gas station and injects fuel before the fuel tank becomes empty.

When a vehicle travels on a circuit, fuel is rapidly and quickly consumed due to rapid acceleration and rapid deceleration. In general, a fuel gauge is lowered to the state 'empty' from the state 'full' depending on a preset damping time. We have discovered that when a vehicle travels on a circuit, the drop in the level shown on a fuel gauge does not reflect the actual consumption of fuel. Thus, even though the fuel gauge is not lowered to the state 'empty', the vehicle becomes incapable of traveling.

SUMMARY

The present disclosure provides an apparatus and method of controlling a fuel gauge in a circuit mode of a vehicle for inhibiting a phenomenon whereby a vehicle becomes incapable of traveling before a fuel gauge indicates the state 'empty'.

The present disclosure provides an apparatus and method of controlling a fuel gauge in a circuit mode of a vehicle for determining whether a driving mode of the vehicle is a circuit mode or a general mode and differently applying a method of deriving a current fuel amount.

In one form, an apparatus for controlling a fuel gauge in a circuit mode of a vehicle is provided. The apparatus includes a vehicle mode determiner configured to compare a damping time as a setting value for limiting a fall time of the fuel gauge with a response time as a time taken for the fuel gauge to actually descend to a state 'empty' from a state 'full' due to fuel consumption of an engine, and to determine whether a driving mode of the vehicle is a general mode or a circuit mode, a fuel amount calculator configured to calculate a current fuel amount of the vehicle based on fuel consumption (FCO) of the engine or a change in resistance of a fuel sender depending on the driving mode of the vehicle, and a fuel gauge controller configured to control the fuel gauge based on the calculated current fuel amount.

For example, the response time may be a value obtained by dividing a total amount of fuel to be consumed while the fuel gauge is changed to the state 'empty' from the state 'full', by the FCO.

For example, the damping time may be a value obtained by multiplying a predetermined previous damping time by a damping time tuning value equal to or greater than 1.

For example, when the response time is less than the damping time, the vehicle mode determiner may count a circuit entry ON flag, and when the damping time is equal to or less than the response time, the vehicle mode determiner may count a circuit entry OFF flag.

For example, after the engine is ignited, the vehicle mode determiner may reset the previously counted circuit entry flag.

For example, the vehicle mode determiner may reset count of the circuit entry OFF flag when the circuit entry ON flag is counted, and the vehicle mode determiner may reset count of the circuit entry ON flag when the circuit entry OFF flag is counted.

For example, the vehicle mode determiner may determine whether the circuit entry ON flag is counted for a delay time when a counted number of the circuit entry ON flag reaches a preset number, and when the circuit entry ON flag is counted for the delay time, the vehicle mode determiner may determine the driving mode of the vehicle as a circuit mode.

For example, when a mode of the vehicle is the circuit mode, the fuel amount calculator may calculate the current fuel amount of the vehicle based on a value obtained by multiplying the FCO by an FCO tuning value, and the FCO tuning value may be a value greater than 1.

For example, the vehicle mode determiner may determine whether the circuit entry OFF flag is counted for a delay time when a counted number of the circuit entry OFF flag reaches a preset number, and when the circuit entry OFF flag is counted for the delay time, the vehicle mode determiner may determine the driving mode of the vehicle as the general mode.

For example, when the mode of the vehicle is the general mode, the fuel amount calculator may calculate the current fuel amount based on the change in resistance of the fuel sender, the fuel gauge controller may control the fuel gauge based on the damping time that is changed depending on a change in a speed of the vehicle, and the damping time may be a value obtained by multiplying a predetermined previous damping time by a damping time tuning value that is a value equal to or greater than 1.

In another form, a method of controlling a fuel gauge in a circuit mode of a vehicle is provided. The method includes comparing a damping time as a setting value for limiting a fall time of the fuel gauge with a response time as a time taken for the fuel gauge to actually descend to a state 'empty' from a state 'full' due to fuel consumption of an engine, and determining whether a driving mode of the vehicle is a general mode or a circuit mode, by a controller, calculating a current fuel amount of the vehicle based on a change in resistance of a fuel sender when a mode of the vehicle is the general mode, and calculating the current fuel amount of the vehicle based on a value obtained by multiplying fuel consumption (FCO) of the engine by an FCO tuning value when the mode of the vehicle is the circuit mode, by the controller, and controlling the fuel gauge based on the calculated current fuel amount, by the controller.

For example, the damping time may be a value obtained by multiplying a predetermined previous damping time by a damping time tuning value equal to or greater than 1, and the response time may be a value obtained by dividing a total amount of fuel to be consumed while the fuel gauge is changed to the state 'empty' from the state 'full', by the FCO.

For example, the determining whether the driving mode of the vehicle is the general mode or the circuit mode may include determining whether the response time is greater than 0, counting circuit entry ON flag when the damping time is greater than the response time, and counting the circuit entry OFF flag when the response time is equal to or greater than the damping time, and counting any one of the circuit entry ON flag or the circuit entry OFF flag and checking whether the one counted flag is continuously counted for a preset delay time.

For example, when any one of the circuit entry ON flag or the circuit entry OFF flag is counted, count of other one flag other than the one counted flag may be reset.

For example, when the circuit entry ON flag is counted, the controller may determine whether the circuit entry ON flag is continuously counted for a first delay time, when the circuit entry OFF flag is counted, the controller may determine whether the circuit entry OFF flag is continuously counted for a second delay time, and the first delay time may be set to be less than the second delay time to reduce a frequency at which the driving mode of the vehicle is switched to the general mode from the circuit mode.

For example, the controller may determine the driving mode of the vehicle as the circuit mode when the circuit entry ON flag is continuously counted for the first delay time, and the controller may determine the driving mode of the vehicle as the general mode when the circuit entry OFF flag is continuously counted for the second delay time.

For example, when the circuit entry OFF flag instead of the circuit entry ON flag is counted for the first delay time or the circuit entry ON flag instead of the circuit entry OFF flag is counted for the second delay time, the controller may maintain a current driving mode of the vehicle.

For example, the controlling the fuel gauge may include controlling the fuel gauge by applying the damping time that is changed depending on a speed of the vehicle, to the current fuel amount derived based on a change in resistance of the fuel sender, when the driving mode of the vehicle is the general mode, by the controller, and controlling the fuel gauge depending on the current fuel amount derived based on a final FCO obtained by applying an FCO tuning value to the FCO when the driving mode of the vehicle is the circuit mode, by the controller.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
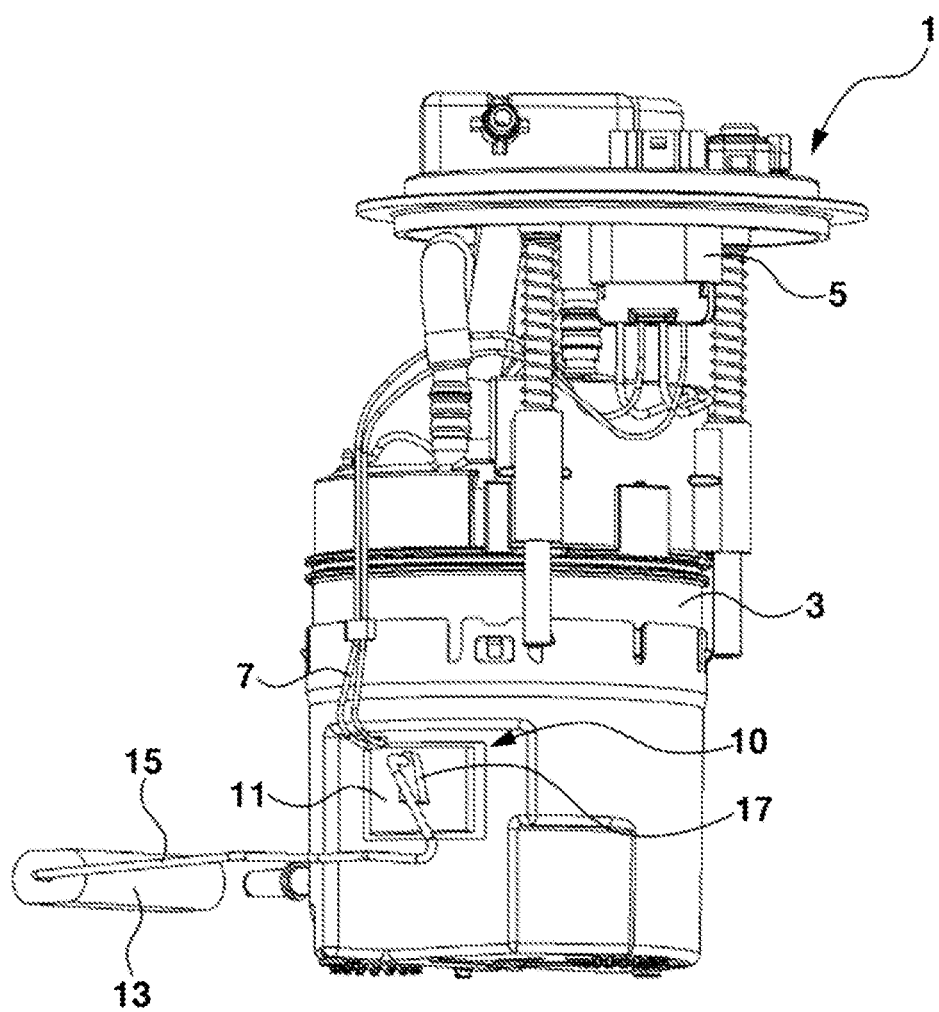
FIG. 1 is a perspective view of a fuel sender assembly according to one form of the present disclosure.

The statements in this section merely provide background information related to the present disclosure and may not constitute prior art.

DETAILED DESCRIPTION

The following description is merely exemplary in nature and is not intended to limit the present disclosure, application, or uses. It should be understood that throughout the drawings, corresponding reference numerals indicate like or corresponding parts and features.

The attached drawings for illustrating exemplary forms of the present disclosure are to be referred to in order to gain a sufficient understanding of the present disclosure, the merits thereof, and the objectives accomplished by the implementation of the present disclosure. The present disclosure may, however, be embodied in many different forms, and should not be construed as being limited to the forms set forth herein; rather, these forms are provided so that this disclosure will be thorough and complete, and will fully convey the concept of the disclosure to one of ordinary skill in the art. Meanwhile, the terminology used herein is for the purpose of describing particular forms and is not intended to limit the disclosure. Like reference numerals in the drawings denote like elements.

Terms such as 'unit' or 'module', etc., should be understood to indicate units that process at least one function or operation and that may be embodied in a hardware manner, a software manner, or a combination of a hardware manner and a software manner.

Terms, such as "first", "second", and the like used in the specification may be used to distinguish the relevant elements using the reference relationship, and are not limited by the order.

The detailed description is used to exemplify the disclosure. The description herein is given to show exemplary forms of the present disclosure, and the disclosure may be used in various other combinations, changes, and environments. That is, the disclosure may be changed or modified within the scope of the concept of the disclosure disclosed in the specification, the equivalent scope of the given disclosure, and/or the scope of the technology or knowledge in the art. The described form is the ideal form for implementing the technological spirit of the disclosure, but may be changed in various forms required in detailed applications and use of the disclosure. Thus, the detailed description of the disclosure herein is merely exemplary, and is not intended to limit the disclosure. The following claims are to be interpreted as including other forms.

FIG. 1 is a perspective view of a fuel sender assembly according to one form of the present disclosure.

Referring to FIG. 1, a fuel sender assembly 1 may include a sensing unit 5, a fuel sender 10, and a float 13. The fuel sender 10 may include a reservoir cup 3 and a resistance card 11. The float 13 may be connected to the fuel sender 10 through a float arm 15 and a contact arm 17. The reservoir cup 3 may refer to a space which is filled with fuel in advance in order to smoothly supply fuel when a vehicle travels on a sloped road in the state in which the amount of fuel in a fuel tank is insufficient.

The float 13 may be moved up and down depending on the height of a flow level of fuel due to buoyancy, and the contact arm 17 may be rotated while the float arm 15 is rotated as the float 13 is moved up and down. The resistance card 11 may be connected to the sensing unit 5 via a cable 7, and the fuel sender 10 may output information about a change in the rate of flow of fuel via contact between the contact arm 17 and the resistance card 11, as a variable resistance value. For example, the variable resistance value may be a value in the range of 15Ω and 300Ω. The output variable resistance value may be transmitted to the sensing unit 5, and the sensing unit 5 may transmit the variable resistance value to a cluster of a gauge (in detail, an ECU of a cluster). The cluster may analyze the received variable resistance value to derive the current amount of fuel in the fuel tank, and may display the current fuel amount.

Figure 2:
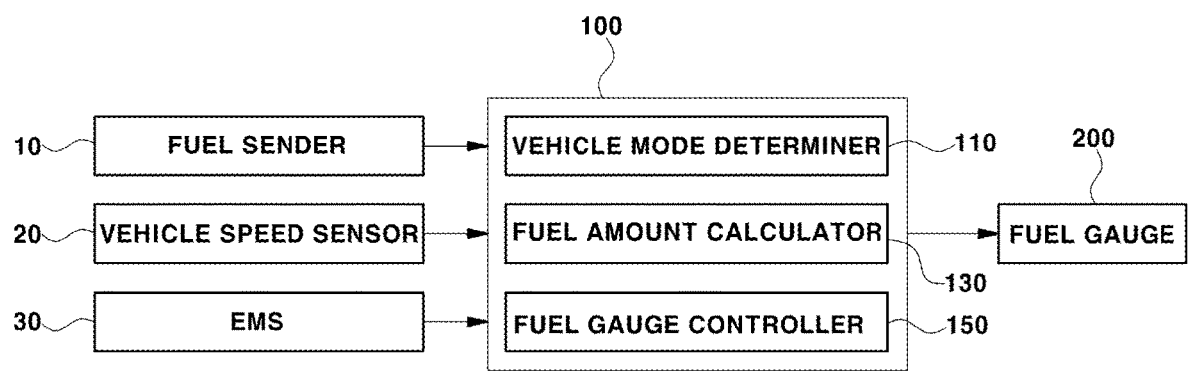
FIG. 2 is a block diagram showing an apparatus for controlling a fuel gauge in a circuit mode of a vehicle according to one form of the present disclosure.

FIG. 2 is a block diagram showing an apparatus for controlling a fuel gauge in a circuit mode of a vehicle according to one form of the present disclosure.

Referring to FIGS. 1 and 2, the apparatus for controlling a fuel gauge in a circuit mode of a vehicle may include the fuel sender 10, a vehicle speed sensor 20, an engine management system (EMS) 30, a controller 100, and a fuel gauge 200.

The fuel sender 10, the vehicle speed sensor 20, and the EMS 30 are components for outputting information for controlling a fuel gauge. The contact arm 17 and the resistance card 11 may contact each other due to movement of the float 13 depending on the height of a flow level of fuel in the fuel tank, and the fuel sender 10 may output a resistance change value due to contact. The output resistance change value may be transmitted to the controller 100.

The vehicle speed sensor 20 may be a sensor for measuring a speed of a vehicle. The speed of the vehicle may be a parameter used to determine a damping time depending on a speed. For example, the vehicle speed sensor 20 may include a sensor for measuring an engine RPM, a sensor for measuring a direct speed of the vehicle, or the like. The measured speed of the vehicle may be transmitted to the controller 100.

The EMS 30 may calculate fuel consumption (FCO) of an engine based on an air/fuel ratio (a weight ratio of air to fuel). The FCO calculated by the EMS 30 may be transmitted to the controller 100.

The controller 100 may determine the driving mode of the vehicle and may control the fuel gauge 200 based on the current fuel amount of the vehicle, derived based on the driving mode of the vehicle. The controller 100 may include a vehicle mode determiner 110, a fuel amount calculator 130, and a fuel gauge controller 150 according to functions thereof. For example, the controller 100 may be an electronic control unit (ECU) for controlling a cluster.

The vehicle mode determiner 110 may compare a damping time with a response time to determine the driving mode of the vehicle. The damping time may be a setting value for limiting a fall time of the fuel gauge, and may refer to a set delay time taken to lower the fuel gauge 200 to the lowermost position 'empty' from the uppermost position 'full'. The damping time may be changed depending on the current vehicle speed, and may be a value preset by a designer. The damping time is set in order to inhibit the fuel gauge 200 from being rapidly changed even if the flow level of the fuel is changed when the vehicle travels on a sloped road or turns rapidly. For example, even if fuel is discharged to change the state of the fuel tank to the state 'empty' due to maintenance or other reasons from the state 'full' in which fuel is injected into the fuel tank, the fuel gauge 200 may indicate the state 'empty' even after the set damping time elapses. The response time may be the time actually taken for the fuel gauge to be lowered to the state 'empty' from the state 'full' due to fuel consumption by an engine. The response time may be a value obtained by dividing the total amount of fuel to be consumed while the fuel gauge 200 is changed to the state 'empty' from the state 'full' due to fuel consumption (FCO).

The vehicle mode determiner 110 may count a circuit entry flag for determining whether a vehicle enters a circuit mode by performing a comparison to determine which of the damping time and the response time is greater. When the damping time is greater than the response time, the vehicle mode determiner 110 may generate a circuit entry ON flag. When the response time is equal to or greater than the damping time, the vehicle mode determiner 110 may generate a circuit entry OFF flag. When the damping time is greater than the response time, this means that the drop in the fuel gauge 200 does not follow an actual consumption of fuel. When the response time is equal to or greater than the damping time, this means that the drop in the fuel gauge 200 follows the actual consumption of fuel. In particular, when the response time is greater than the damping time, this means that a vehicle is determined to travel using fuel. The circuit entry ON flag may be a flag for determining that a driving mode of a vehicle is in a circuit mode, and the circuit entry OFF flag may be a flag for determining that the driving mode of the vehicle is a general mode. For example, the circuit mode may be a mode in which the vehicle travels on a circuit in which rapid acceleration, steep turning, and rapid deceleration of the vehicle frequently occur, and the general mode may be a mode in which the vehicle travels on a highway. The vehicle mode determiner 110 may determine the driving mode of the vehicle as the circuit mode when the circuit entry ON flag is counted a predetermined number of times or when the circuit entry ON flag is continuously counted for a predetermined time. The vehicle mode determiner 110 may determine the driving mode of the vehicle as the general mode when the circuit entry OFF flag is counted a predetermined number of times and when the circuit entry OFF flag is counted for a predetermined time.

The fuel amount calculator 130 may calculate the current fuel amount of the vehicle based on fuel consumption (FCO) of an engine or a change in the resistance of the fuel sender 10 depending on the driving mode of the vehicle.

In detail, when the driving mode of the vehicle is a general mode, the fuel amount calculator 130 may calculate the current fuel amount based on a change in the resistance of the fuel sender 10. Information on the current fuel amount corresponding to a change value of the resistance of the fuel sender 10 may be stored in the controller 100. The height of a flow level of fuel in the fuel tank may be continuously changed depending on driving conditions (sloped-road traveling, a curve of a road, a driving pattern, and the like) of the vehicle, and thus an error that occurs when the current fuel amount is derived may be reduced by averaging fuel amounts that are derived for a predetermined time. For example, averaging of the fuel amounts means that a fuel amount is derived 32 times in 100 ms, and the fuel amount calculator 130 may derive an average value of fuel amounts as the current fuel amount.

When the driving mode of the vehicle is a circuit mode, the fuel amount calculator 130 may calculate the current fuel amount of the vehicle based on the fuel consumption (FCO). The current fuel amount may refer to a current fuel amount. In this case, the fuel amount calculator 130 may calculate the current fuel amount based on a final FCO obtained by multiplying the FCO derived by the EMS 30 and an FCO tuning value. For example, the FCO tuning value may be a value greater than 1. The FCO tuning value may be differently determined depending on the type of the vehicle, the width of the fuel tank, the volume of the reservoir cup 3 of the fuel sender assembly 1, and the like. The fuel amount calculator 130 may calculate the current fuel amount by subtracting an accumulated value of the final FCO obtained by multiplying the FCO and the FCO tuning value, from the current fuel amount calculated when the driving mode of the vehicle is a general mode. When the FCO tuning value is greater than 1, this means that the fuel amount calculator 130 determines that fuel is rapidly consumed. That is, fuel is more rapidly consumed in the circuit mode than in the general mode, and thus the fuel amount calculator 130 may derive the current fuel amount as the final FCO obtained by multiplying the measured FCO by an FCO tuning value greater than 1 to make the drop in the fuel gauge 200 follow the actual FCO.

The fuel gauge controller 150 may control the fuel gauge 200 based on the calculated current fuel amount. The fuel gauge 200 may be an analog-type gauge disposed in one region of a cluster, or may be a display device such as an LCD depending on the configuration of the cluster. The fuel gauge 200 may display the current fuel amount calculated by the fuel amount calculator 130 in real time. The fuel gauge controller 150 may control the fuel gauge 200 based on a value obtained by performing linear damping processing on the current fuel amount when the driving mode of the vehicle is the general mode. For example, the linear damping processing means that a fuel gauge is driven and controlled by controlling a total amount of fuel in a digital manner using 256 bits, dividing a vehicle speed into several sections, and differently setting a damping time for a corresponding vehicle-speed section. The linear damping processing may be performed when the drop in the fuel gauge 200 is determined to follow an actual consumption of fuel (that is, a general mode). When the driving mode of the vehicle is the circuit mode, the fuel gauge controller 150 may control the fuel gauge 200 based on the current fuel amount rather than performing linear damping processing. The method of calculating the current fuel amount may be changed depending on the driving mode of the vehicle. That is, in the circuit mode, which is a driving mode characterized by rapid acceleration, rapid deceleration, and high rightward and leftward lateral force, the fuel tank may be seriously shaken, and thus the fuel sender 10 may output an inaccurate signal irrespective of the actual current fuel amount of the vehicle. According to one form of the present disclosure, in the circuit mode of the vehicle, the apparatus for controlling a fuel gauge may estimate the current fuel amount as the final FCO, obtained by multiplying the FCO and the tuning value of the FCO, instead of a signal output by the fuel sender 10 when the driving mode of the vehicle is the circuit mode.

According to one form of the present disclosure, the controller 100 may change the method of calculating the current fuel amount of the vehicle depending on the driving mode of the vehicle, and thus the fuel gauge may follow the actual FCO when the driving mode of the vehicle is the circuit mode.

According to one form of the present disclosure, the controller 100 may determine the driving mode of the vehicle by performing a comparison to determine which of the damping time and the response time is greater, and may determine the driving mode of the vehicle using the damping time obtained by multiplying the previous damping time by the damping time tuning value in order to improve the capability of the fuel gauge 200 to follow the actual FCO. In the general mode, the controller 100 may improve the capability of the fuel gauge 200 to follow the actual FCO by controlling the fuel gauge 200 using the damping time obtained by multiplying the previous damping time by the damping time tuning value.

Figure 3:
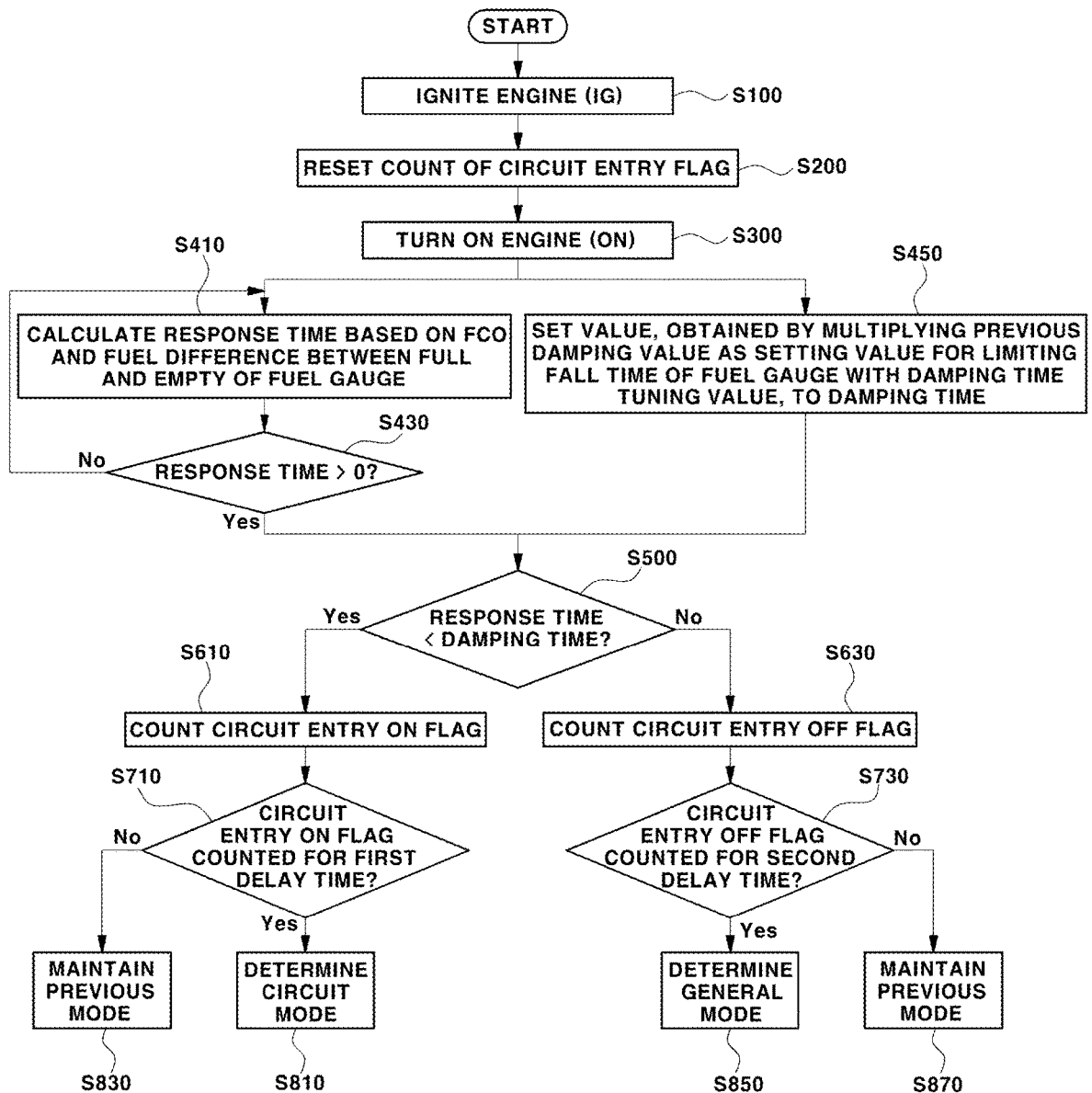
FIG. 3 is a flowchart of a method of determining a driving mode of a vehicle according to one form of the present disclosure.

FIG. 3 is a flowchart of a method of determining a driving mode of a vehicle according to one form of the present disclosure.

Referring to FIGS. 2 and 3, after an engine is ignited (IG ON), the controller 100 may reset the count of a circuit entry flag (S100 and S200).

When the engine is turned on, the controller 100 may derive a response time and a damping time based on a fuel amount when the fuel gauge 200 is lowered to the state 'empty' from the state 'full', an FCO derived by the EMS 30, and a preset previous damping time (S300).

The vehicle mode determiner 110 may calculate the response time based on the fuel consumption (FCO) and a difference of the amount of fuel between the state 'empty' from the state 'full' of the fuel gauge 200. In other words, the response time may be a value obtained by dividing the total amount of fuel consumed while the fuel gauge 200 is changed to the state 'empty' from the state 'full' by the FCO (S410).

The vehicle mode determiner 110 may determine whether the response time is greater than 0. When the response time is equal to or less than 0, this means that fuel is not consumed in an engine but that the vehicle is traveling. For example, during coasting, the response time may be 0. Thus, the driving mode of the vehicle may be determined only when the response time is greater than 0 in order to improve the capability of the fuel gauge 200 to follow the actual FCO according to the present disclosure (S430).

The vehicle mode determiner 110 may set a value, obtained by multiplying the preset previous damping time by the damping time tuning value, as a damping time. The damping time may be a value obtained by multiplying a predetermined previous damping time by a damping time tuning value that is equal to or greater than 1. A value that is equal to or greater than 1 may be used as the damping time tuning value in order to improve the capability of the fuel gauge 200 to follow the actual FCO in a driving mode in which the reliability of a change value of resistance of the fuel sender 10 is degraded, such as sloped-road traveling (S450).

The vehicle mode determiner 110 may compare the response time and the damping time. When the response time is less than the damping time, the vehicle mode determiner 110 may count the circuit entry ON flag, and when the damping time is equal to or less than the response time, the vehicle mode determiner 110 may count the circuit entry OFF flag. When the circuit entry ON flag is counted, the vehicle mode determiner 110 may reset the previous count of circuit entry OFF flag, and when the circuit entry OFF flag is counted, the vehicle mode determiner 110 may reset the previous count of the circuit entry ON flag. In other words, when either one of the circuit entry ON flag and the circuit entry OFF flag is counted, the vehicle mode determiner 110 may reset the count of the other one flag other than the one counted flag (S500, S610, and S630).

The vehicle mode determiner 110 may determine whether a counted number of the circuit entry ON flag reaches a preset number. When the accumulated count of the circuit entry ON flag reaches the preset number, the vehicle mode determiner 110 may determine whether the circuit entry ON flag has been continuously counted for a first delay time. That is, the vehicle mode determiner 110 may count any one of the circuit entry ON flag or the circuit entry OFF flag and may check whether the one counted flag is continuously counted for a preset delay time (S710).

The vehicle mode determiner 110 may determine whether a counted number of the circuit entry OFF flag reaches a preset number. When the counted number of the circuit entry OFF flag reaches the preset number, the vehicle mode determiner 110 may determine whether the circuit entry OFF flag is continuously counted for a second delay time. In order to reduce a frequency at which the driving mode of the vehicle is switched to a general mode from a circuit mode, the second delay time may be greater than the first delay time (S730).

When the circuit entry ON flag is counted for the first delay time, the vehicle mode determiner 110 may determine that the driving mode of the vehicle as the circuit mode (S810).

When the circuit entry OFF flag, instead of the circuit entry ON flag, is counted for the first delay time, the vehicle mode determiner 110 may maintain the current driving mode of the vehicle. That is, the vehicle mode determiner 110 may maintain a general mode that is the current driving mode (S830).

When the circuit entry OFF flag is counted for the second delay time, the vehicle mode determiner 110 may determine the driving mode of the vehicle as the general mode (S850).

When the circuit entry ON flag instead of the circuit entry OFF flag is counted for the second delay time, the vehicle mode determiner 110 may maintain the current driving mode of the vehicle. That is, the vehicle mode determiner 110 may maintain the circuit mode, that is, the current driving mode (S870).

Figure 4:
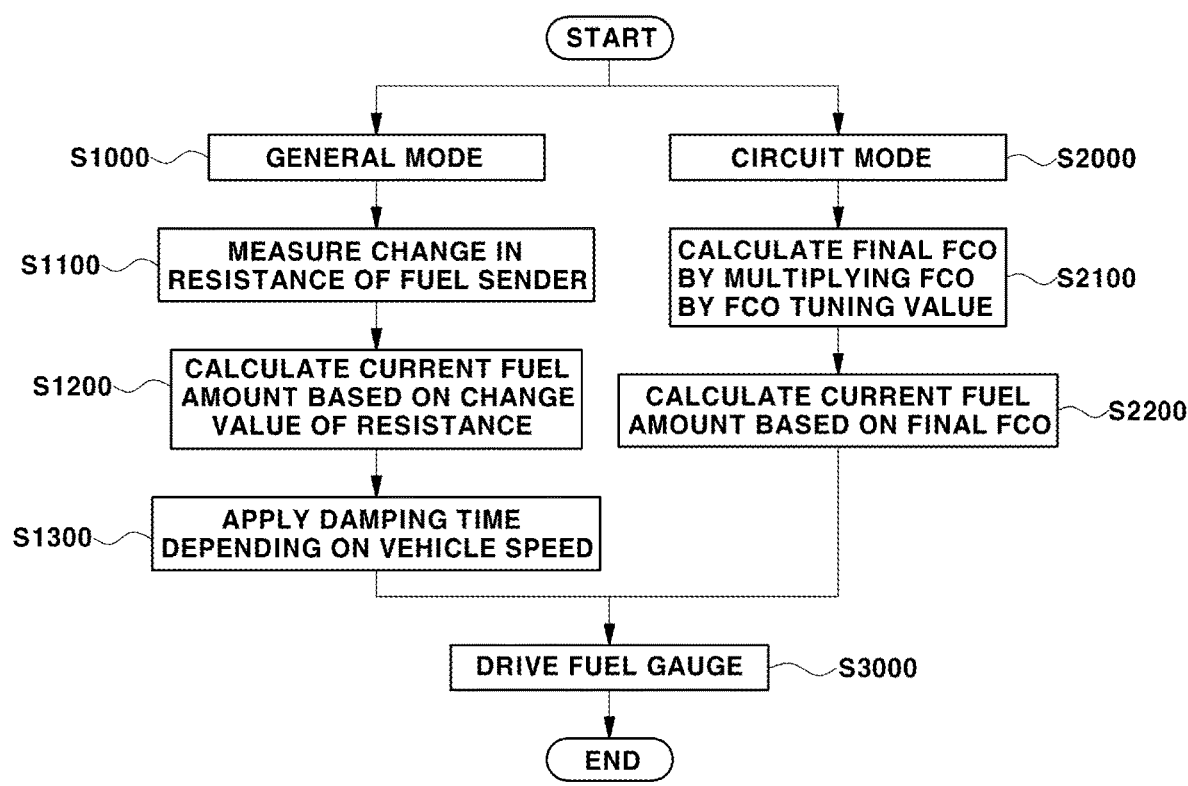
FIG. 4 is a flowchart of a method of calculating a current fuel amount depending on a driving mode of a vehicle according to one form of the present disclosure.

FIG. 4 is a flowchart of a method of calculating a current fuel amount depending on a driving mode of a vehicle according to one form of the present disclosure.

Referring to FIGS. 2 to 4, the fuel amount calculator 130 may differently derive the current fuel amount depending on the driving mode of the vehicle, determined by the vehicle mode determiner 110.

When the driving mode of the vehicle is the general mode, the fuel amount calculator 130 may derive the current fuel amount based on a change in a resistance value measured by the fuel sender 10, rather than on fuel consumption (FCO) (S1000 and S1100).

The fuel amount calculator 130 may derive the current fuel amount based on the resistance change value measured by the fuel sender 10. In this case, the height of a flow level of fuel in the fuel tank may be continuously changed depending on driving conditions (sloped-road traveling, a curve of a road, a driving pattern, and the like) of the vehicle, and thus an error that occurs when the current fuel amount is derived may be reduced by averaging fuel amounts that are derived for a predetermined time. The fuel amount calculator 130 may derive an average of the fuel amounts measured for a predetermined time as the current fuel amount (S1200).

The fuel gauge controller 150 may control the fuel gauge 200 by applying a damping time, which changes depending on a vehicle speed, to a current fuel amount derived based on a change in the resistance of the fuel sender. The damping time may be a value obtained by multiplying the previous damping time by the damping time tuning value. As such, a phenomenon whereby the fuel gauge 200 is frequently changed may be reduced in a driving pattern such as sloped-road traveling, even when the driving mode of the vehicle is a general mode (S1300 and S300).

When the driving mode of the vehicle is the circuit mode, the fuel amount calculator 130 may derive the current fuel amount based on fuel consumption (FCO) (S2000).

The fuel amount calculator 130 may calculate the final FCO by multiplying the FCO by the FCO tuning value. For example, the FCO tuning value may be a value greater than 1. In detail, the fuel amount calculator 130 may calculate the current fuel amount by subtracting an accumulated value of the final FCO obtained by multiplying the FCO and the FCO tuning value, from the current fuel amount calculated when the driving mode of the vehicle is a general mode. That is, fuel is more rapidly consumed in the circuit mode than in the general mode, and thus the fuel amount calculator 130 may derive the current fuel amount as the final FCO obtained by multiplying the measured FCO by an FCO tuning value greater than 1 to make the drop in the fuel gauge 200 follow an actual FCO (S2100 and S2200).

The fuel gauge controller 150 may control the fuel gauge 200 based on current fuel amount, derived based on the final FCO. Because the fuel gauge 200 is controlled based on the current fuel amount derived based on the final FCO, fuel may actually remain in the fuel tank even when the fuel gauge 200 indicates the state 'empty'. Thus, a phenomenon whereby a vehicle becomes incapable of traveling may be inhibited before the fuel gauge 200 indicates the state 'empty' (S3000).

According to one form of the present disclosure, in a circuit mode characterized by rapid acceleration, rapid deceleration, and high rightward and leftward lateral force, the fuel tank may be seriously shaken, and thus the fuel sender 10 may output an inaccurate signal irrespective of the actual current fuel amount of the vehicle. Accordingly, when the driving mode of the vehicle is the circuit mode, the controller 100 may control the fuel gauge based on the FCO and the FCO tuning value.

According to one form of the present disclosure, the controller may change the method of calculating the current fuel amount of the vehicle depending on the driving mode of the vehicle, and thus the fuel gauge may follow the actual FCO when the driving mode of the vehicle is the circuit mode.

According to one form of the present disclosure, the controller may determine the driving mode of the vehicle by performing a comparison to determine which of the damping time and the response time is greater, and may determine the driving mode of the vehicle using the damping time obtained by multiplying a previous damping time by the damping time tuning value in order to improve the capability of the fuel gauge to follow the actual FCO. In the general mode, the controller may improve the capability of the fuel gauge to follow the actual FCO by controlling the fuel gauge using the damping time obtained by multiplying the previous damping time by the damping time tuning value.

The present disclosure has been described in detail with reference to exemplary forms thereof. However, it will be appreciated by those skilled in the art that changes may be made in these forms without departing from the principles and spirit of the present disclosure, the scope of which is defined in the appended claims and their equivalents.

What is claimed is:

1. An apparatus for controlling a fuel gauge in a circuit mode of a vehicle, the apparatus comprising:
   a vehicle mode determiner configured to compare a damping time with a response time, and to determine whether a driving mode of the vehicle is a general mode or a circuit mode;

a fuel amount calculator configured to calculate a current fuel amount of the vehicle based on fuel consumption (FCO) of the engine or a change in resistance of a fuel sender based on the driving mode of the vehicle; and a fuel gauge controller configured to control the fuel gauge based on the calculated current fuel amount, wherein the response time is a time taken for the fuel gauge to actually descend to a state 'empty' from a state 'full' due to fuel consumption of an engine.

2. The apparatus of claim 1, wherein the response time is a value obtained by dividing a total amount of fuel to be consumed while the fuel gauge is changed to the state 'empty' from the state 'full' by the FCO.

3. The apparatus of claim 1, wherein the damping time is a value obtained by multiplying a predetermined previous damping time by a damping time tuning value that is equal to or greater than 1.

4. The apparatus of claim 1, wherein when the response time is less than the damping time, the vehicle mode determiner is configured to count a circuit entry ON flag; and when the damping time is equal to or less than the response time, the vehicle mode determiner is configured to count a circuit entry OFF flag.

5. The apparatus of claim 4, wherein, after the engine is ignited, the vehicle mode determiner is configured to reset a previously counted circuit entry flag.

6. The apparatus of claim 4, wherein when the circuit entry ON flag is counted, the vehicle mode determiner is configured to reset a count of the circuit entry OFF flag; and when the circuit entry OFF flag is counted, the vehicle mode determiner is configured to reset a count of the circuit entry ON flag.

7. The apparatus of claim 6, wherein when a counted number of the circuit entry ON flags reaches a preset number, the vehicle mode determiner is configured to determine whether the circuit entry ON flag is counted for a delay time; and when the circuit entry ON flag is counted for the delay time, the vehicle mode determiner is configured to determine the driving mode of the vehicle as a circuit mode.

8. The apparatus of claim 7, wherein, when the driving mode is the circuit mode, the fuel amount calculator is configured to calculate the current fuel amount of the vehicle based on a value obtained by multiplying the FCO by an FCO tuning value that is greater than 1.

9. The apparatus of claim 4, wherein when a counted number of the circuit entry OFF flags reaches a preset number, the vehicle mode determiner is configured to determine whether the circuit entry OFF flag is counted for a delay time; and when the circuit entry OFF flag is counted for the delay time, the vehicle mode determiner is configured to determine the driving mode of the vehicle as the general mode.

10. The apparatus of claim 9, wherein, when the mode of the vehicle is the general mode, the fuel amount calculator is configured to calculate the current fuel amount based on the change in resistance of the fuel sender;

the fuel gauge controller is configured to control the fuel gauge based on the damping time, which changes based on a change in a speed of the vehicle; and the damping time is a value obtained by multiplying a predetermined previous damping time by a damping time tuning value that is a value equal to or greater than 1.

11. A method of controlling a fuel gauge in a circuit mode of a vehicle, the method comprising:

comparing, by a controller, a damping time with a response time, wherein the response time is a time taken for the fuel gauge to actually descend to a state 'empty' from a state 'full' due to fuel consumption of an engine;

determining, by the controller, whether a driving mode of the vehicle is a general mode or a circuit mode;

calculating, by the controller, a current fuel amount of the vehicle based on a change in resistance of a fuel sender when a mode of the vehicle is the general mode, and calculating, by the controller, the current fuel amount of the vehicle based on a value obtained by multiplying fuel consumption (FCO) of the engine by an FCO tuning value when the mode of the vehicle is the circuit mode; and controlling, by the controller, the fuel gauge based on the calculated current fuel amount.

12. The method of claim 11, wherein the damping time is a value obtained by multiplying a predetermined previous damping time by a damping time tuning value that is equal to or greater than 1; and the response time is a value obtained by dividing a total amount of fuel to be consumed while the fuel gauge is changed to the state 'empty' from the state 'full', by the FCO.

13. The method of claim 11, wherein determining whether the driving mode of the vehicle is the general mode or the circuit mode comprises:

determining, by the controller, whether the response time is greater than 0;

counting, by the controller, a circuit entry ON flag when the damping time is greater than the response time, and counting a circuit entry OFF flag when the response time is equal to or greater than the damping time; and counting, by the controller, any one of the circuit entry ON flag or the circuit entry OFF flag, and checking whether the any one counted flag is continuously counted a preset delay time.

14. The method of claim 13, further comprising:

when the circuit entry ON flag is counted, resetting, by the controller, a count of the circuit entry OFF flag; and when the circuit entry OFF flag is counted, resetting, by the controller, a count of the circuit entry ON flag.

15. The method of claim 13, further comprising:

when the circuit entry ON flag is counted, determining, by the controller, whether the circuit entry ON flag is continuously counted for a first delay time; and when the circuit entry OFF flag is counted, determining, by the controller, whether the circuit entry OFF flag is continuously counted for a second delay time;

wherein the first delay time is set to be less than the second delay time.

16. The method of claim 15, further comprising:

when the circuit entry ON flag is continuously counted for the first delay time, determining, by the controller, the driving mode of the vehicle as the circuit mode; and when the circuit entry OFF flag is continuously counted for the second delay time, determining, by the controller, the driving mode of the vehicle as the general mode.

17. The method of claim 15, further comprising: when the circuit entry OFF flag is counted instead of the circuit entry ON flag for the first delay time or when the circuit entry ON flag is counted instead of the circuit entry OFF flag for the second delay time, maintaining, by the controller, maintaining a current driving mode of the vehicle.

18. The method of claim 11, wherein the controlling the fuel gauge comprises:
when the driving mode of the vehicle is the general mode, controlling, by the controller, the fuel gauge by applying the damping time to the current fuel amount that is derived based on a change in resistance of the fuel sender, wherein the damping time is changed depending on a speed of the vehicle; and
when the driving mode of the vehicle is the circuit mode, controlling, by the controller, the fuel gauge based on the current fuel amount, which is derived based on a final FCO obtained by applying an FCO tuning value to the FCO.

* * * * *